(No Model.)
W. LANE.
SAFETY CAR TRUCK.
No. 308,776. Patented Dec. 2, 1884.
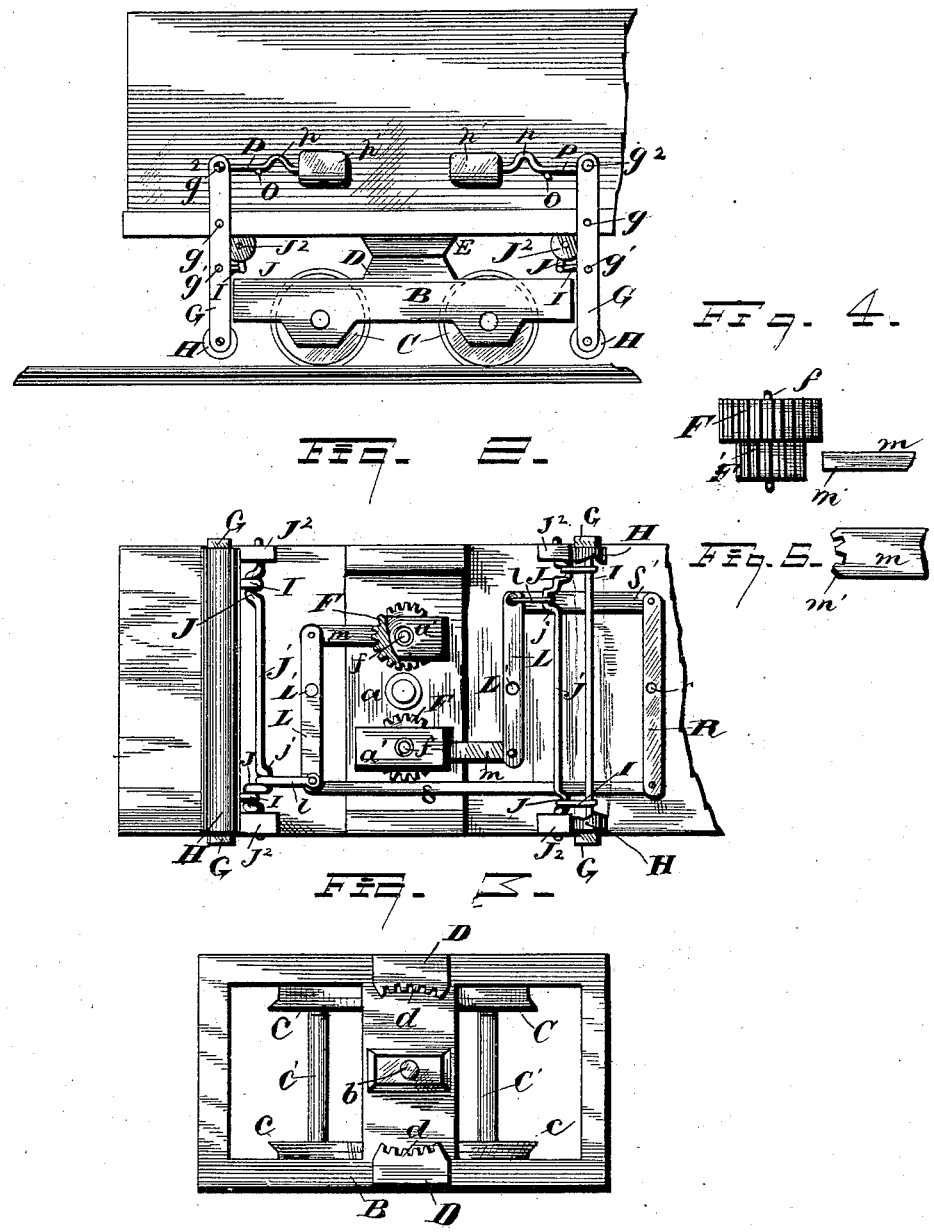
WITNESSES
Wm. M. Monroe
Chas. H. Dorer
INVENTOR
William Lane.
by Leggett & Leggett,
Attorneys

UNITED STATES PATENT OFFICE.

WILLIAM LANE, OF CLEVELAND, OHIO.

SAFETY CAR-TRUCK.

SPECIFICATION forming part of Letters Patent No. 308,776, dated December 2, 1884.

Application filed June 11, 1884. (No model.)

*To all whom it may concern:*

Be it known that I, WILLIAM LANE, of Cleveland, in the county of Cuyahoga and State of Ohio, have invented certain new and useful Improvements in Safety Car-Truck Attachments; and I do hereby declare the following to be a full, clear, and exact description of the invention, such as will enable others skilled in the art to which it pertains to make and use the same.

My invention relates to improvements in car-trucks, the object being to provide rollers suspended just above the track and on either side of the car-wheel, and so arranged that the front roller will first engage the obstruction on the track, and, by means of suitable connecting mechanism, will lock the truck and prevent its turning while the car-wheel engages and passes over the obstruction.

With this object in view my invention consists in certain features of construction and in combination of parts hereinafter described, and pointed out in the claims.

In the accompanying drawings, Figure 1 is a side elevation of a portion of a car and a truck with my improvement attached. Fig. 2 is a plan view of the under side of the car with the truck removed. Fig. 3 is a plan view of the truck. Fig. 4 is an elevation, and Fig. 5 a plan view, of portions of the locking device.

A represents the body of the car, and B the truck, provided in the usual manner with the wheels C and axles C'. The truck is swiveled, in the usual manner, on the pin $b$, that connects the truck with the cross-bar $a$, that forms a part of the frame-work of the car.

D are bolster-blocks attached to the truck, and E are similar bolster-blocks attached to the car-frame, and prevent the car from rocking. The blocks D, on their inner edges, are provided with the segmental racks $d$, that have for a common center the axis of the center-pins.

F and F' are pinions that are preferably integral, and are mounted on the shafts $f$. The upper ends of these shafts are journaled in the cross-bar $a$, and the lower ends are journaled in the boxes $a'$, that are secured to the cross-bar $a$. When the car is in position on the truck, the pinions F engage, respectively, the rack $d$, and as the truck turns a trifle in either direction—as, for instance, in passing around curves in the track—the engaging gears F are also turned correspondingly. The pinion F is shown above the pinion F' in Fig. 4, the same as in Fig. 2, but will be reversed when the car is turned over and placed in position on the truck.

G are arms pivoted to the car-frame at $g$.

H are rollers, the trunnions of which are journaled, respectively, in arms G at either end of the truck and extend across, above and close to the track. In Fig. 2 the central part of the right-hand roller is broken away. A roller and its supporting-arm form a swinging frame. A rod, $g'$, extends from arm to arm through each frame, and are connected, respectively, by the links I to one or more cranks, J, on the rods J'. These rods J' are journaled in the boxes J², and are each provided with a crank, $j$, extending in an opposite direction from the crank J. The cranks $j$ are connected, respectively, by the links $l$ to the levers L. These levers are fulcrumed at L', and at the ends opposite the links $l$ are pivoted to the bar $m$. The free ends of these bars pass through slots in the end of the boxes $a'$, and are notched, as shown in Fig. 5, and form dogs $m'$, that may engage the teeth on the pinions F' and lock the pinions. When the arms G are in their normal or vertical position, the relation of parts is such that the cranks J and $j$ are about vertical, the former extending below and the latter above the shaft J', with the dogs drawn back from the pinions. An obstruction on the track would first engage a roller, H, and swing it toward the car-wheels, and by means of the rod $g'$ and the links I the cranks J would be moved in the same direction and the crank $j$ in the opposite direction, and by means of the link $l$ the attached end of the lever L may be drawn back and the opposite end of the lever thrust forward toward the pinion F', so that the dog $m'$ on the end of the bar $m$ would engage and lock the said pinion, which, by means of the engagement of the pinion F with the segment $d$, would lock the truck so that it could not turn on the pin $b$, and the truck would thus be held straight with the track while passing over the obstruction.

To prevent the roller H from swinging back after passing the obstruction and unlocking the gear F' before the truck-wheels have passed over the obstruction, I have devised the following: P are levers pivoted at $g^2$ to the arms G and bent upward, as shown at $p$, and held down by the weight $p'$ on the stationary pin O, projecting from the side of the car. As the roller H is swung toward the car-wheel, the upper end of the levers G will move in the opposite direction, and will cause the attached lever P to slide along on the pin O until the pin engages the notch or bend $p$, the sides of which form such abrupt inclines that the gravity of the weight $p'$ is sufficient to hold the bend onto the pin O, in which position the relation of parts is such that the dog $m'$ engages the pinion F', and, as aforesaid, prevents the truck from turning. After the car-wheels have passed over the obstruction it is necessary to have some means of automatically unlocking the device. For this purpose, by means of the rod S, I connect the left-hand lever L with one end of the lever R, and by means of the rods S', I connect the right-hand lever L with the other end of the lever R, as shown in Fig. 2. The lever R is fulcrumed in the center at $r$. By means of these connections the swinging frames are made to simultaneously swing toward or from the car-wheels and lock or unlock both of the pinions F'; also both sets of the levers P, with their respective bends $p$, engage the pin O, to hold the locking device to its engagement. The rear roller, when it encounters an obstruction that has been passed once by the forward roller and car-wheels, will always be in a position swung toward the wheel, and consequently toward the obstruction, and its engagement with the obstruction will swing the roller and frame back to their normal position, and by the connections just described will of course swing the forward roller and frame back to their normal positions, resulting in drawing all of the levers P back to the position shown in Fig. 1, and meantime unlock the truck. The result will be the same whichever way the truck is running.

My device would be of little avail in passing large and heavy obstructions, which fortunately are seldom met with, and are usually first encountered by the engine, such encounter resulting usually in the obstruction or engine being thrown from the track. Small obstructions from the lading of the car or otherwise frequently fall upon the track, and are especially dangerous when they are in such position that they first engage the wheels on one rail, and are therefore liable to turn the truck crosswise of the track. The rollers H are of considerable size and are located, as aforesaid, a short distance above the rails, and this distance is increased as the rollers swing back toward the car-wheels, so that the rollers pass over small obstructions about as easily as the car-wheels. The rollers and frames have sufficient strength to raise the end of the car a trifle, if necessary. The very small obstructions that would pass under the roller are not supposed to do any damage.

What I claim is—

1. A safety car-truck attachment consisting, essentially, of a roller at either end of the truck, suspended crosswise of the track and supported by a swinging frame that is pivoted to the car, and a device, preferably as shown, for locking the truck to prevent its turning, and provided with suitable connecting mechanism, and so arranged that the truck is locked when the roller and supporting-frames are swung toward the car-wheels, and unlocked when the said frames and rollers are swung from the car-wheels to their normal position, substantially as set forth.

2. The combination, with the swinging frames and rollers and mechanism connected therewith, as described, for locking the truck, of the levers P, provided with notches or bends $p$ and the weights $p'$, substantially as set forth.

3. The combination, with the swinging frames and rollers, located as described, of the rods S and S' and the lever R, so arranged that the said rollers and frames will simultaneously swing toward and from the car-wheels, substantially as set forth.

In testimony whereof I sign this specification, in the presence of two witnesses, this 3d day of June, 1884.

WILLIAM LANE.

Witnesses:
　ALBERT E. LYNCH,
　CHAS. H. DORER.